Feb. 18, 1930.  L. K. BRAREN  1,747,968
RECIPROCATING PISTON
Filed May 24, 1928
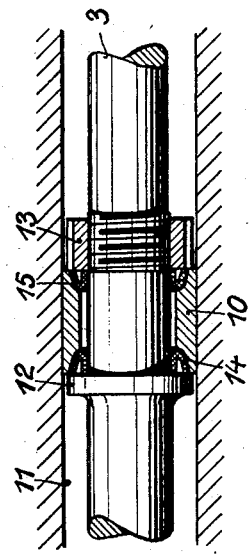
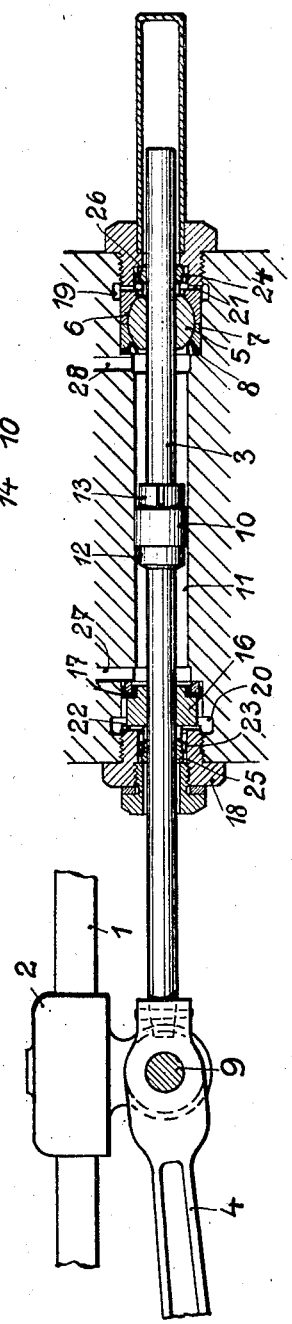
Lorenz Konrad Braren
By Cumpston & Griffith
His Attys.

Patented Feb. 18, 1930

1,747,968

UNITED STATES PATENT OFFICE

LORENZ KONRAD BRAREN, OF MUNICH, GERMANY, ASSIGNOR TO THE FIRM FRIEDRICH DECKEL, PRÄZISIANSMECHANIK UND MASCHINENBAU, OF MUNICH, GERMANY

RECIPROCATING PISTON

Application filed May 24, 1928, Serial No. 280,285, and in Germany January 21, 1927.

This invention relates to reciprocating pistons and refers especially to hydraulic engines working at high pressures. The object of my invention is to provide means for minimizing the hydraulic losses (leakage) without causing undue frictional losses and strain on the moving parts even in case of imperfect alignment.

In order to obtain this object I provide a sliding fit for the reciprocating parts, arrange one of these parts with radial movement and insert an elastic member for closing the aperture. I furthermore provide a two point suspension of the piston rod with free adjustability at the other points.

The above and various other improvements will be hereinafter fully described and claimed. In order that this my invention may be more readily understood reference is made to the accompanying sheet of drawings which show how the invention may be carried into practical effect.

Fig. 1 shows an hydraulic piston with rod and drive partly in section, and

Fig. 2 shows the piston itself on an enlarged scale.

A piston rod 3 is connected to a pin 9 of a cross head 2 reciprocating on a slide 1. A connecting rod 4 is linked to the same pin 9 and transmits the load to or from the piston rod 3 the flow of the load depending whether the piston is part of a pump or of an hydraulic motor. The construction of the further transmitting mechanism as crank pin etc. has not been shown as these are elements well known of no special interest in connection with this invention.

The piston rod 3 passes with a sliding fit through a bore of a ball 5 which is located turnably in two corresponding sockets 6 and 7. An elastic member 8 for instance a U-shaped ring of leather prevents the passage of liquid between the ball 5 and the socket 7. The sliding fit of the rod 3 in the bore of the ball 5 is such as to prevent any undue leakage. For this purpose both parts have highly polished surfaces and fit rather closely.

The piston rod in this manner is suspended at one end on the pin 9 and on the other on the ball 5. Thus small inaccuracies of the slide 1 in relation to the cylinder do not harm. This is of special importance with an hydraulic gear for nonstationary engines for instance locomotives where it is difficult to maintain perfect alignment. The frictional losses in the elastic member 8 are negligible as the movement between the ball 5 and the socket 7 is extremely small.

The piston 10 is fitted in similar manner with a close sliding fit into the bore 11 of the cylinder and is held axially between a shoulder 12 of the piston rod 3 and a nut 13 screwed onto the rod 3. Sufficient radial play is provided between the piston and the rod. Leakage is prevented by elastic U-shaped packing members 14 and 15. The bushing 16 fits similarly over the piston rod 3 while an elastic member 17 prevents leakage around the outside of this bushing which is held with radial play against axial movement by a bushing 18 screwed into the body of the cylinder. The bore in this bushing is somewhat larger than the diameter of the piston rod. The face of the bushing 16 and of the bushing 18 may be finished to a radius struck from the center of the ball 5 in order to permit of an absolutely correct adjustment of the bushing 16. For a long radius however this is hardly necessary because in such a case a spherical face approximates closely a plane.

Any liquid leaking through on either end is conducted away by recesses 19 and 20 which communicate with the spaces around the piston rod in back of the bushings 5 and 16 by passages 21 and 22. The recesses 19 and 20 are connected to the suction chamber in a manner not further shown. In order to prevent any of this leakage being drawn to the outside by the reciprocating piston rod two bushings 25 and 26 fitting over the rod with packing members 23 and 24 are provided of similar construction as described previously. Passages 27 and 28 on both ends of the cylinder conduct the liquid to or from the cylinder. The valves and the valve gearing being not part of this invention are of usual construction and have therefore not been shown. The cylinder of course may as well be provided with a bushing for the piston to move in. This arrangement is primarily intended for liquids under high pressure but can also be used to advantage in connection with compressed gases or vapours.

Having now particularly described and ascertained the nature of this my invention and in what manner the same is to be performed I do not wish to be understood as limiting myself to the exact details of construction as obviously many modifications will occur to a person skilled in the art.

What I claim is:

1. In combination with a cylinder, a piston sliding therein, a piston rod projecting through said piston, means slidably supporting the rod for movement within the cylinder, means connecting said piston rod to said piston for axial movement within the cylinder, and elastic packing located between said piston and said connecting means and serving to space the rod from the surrounding wall of the piston.

2. In combination with a cylinder, a piston sliding therein, a piston rod, the bore in said piston being of larger diameter than the diameter of said piston rod, shoulders on said piston rod for connecting said piston in an axial direction to said piston rod, said shoulders permitting a relative radial movement of the rod, and elastic packing means interposed between said shoulders and piston for preventing leakage between said piston and piston rod.

3. In combination with a cylinder, a piston reciprocating therein, a piston rod connected axially to said piston, a guide member for said piston rod having a relatively close fit with the rod, means for holding said guide member against axial movement while permitting a slight radial movement thereof, and elastic packing means for preventing the escape of fluid from the cylinder through said guide member.

4. In combination with a cylinder, a double acting piston, a piston rod in radially floating connection with said piston, a guide, a member pivoted to said piston rod and mounted to slide on the guide approximately parallel to the bore of said cylinder, a stuffing box located between said piston and said sliding member, said stuffing box being arranged stationary in an axial direction but with radial movement and a second stuffing box on the further side of said piston, said second stuffing box being held stationary but free to accommodate itself to slight inclinations in the position of said piston rod.

5. In combination with a cylinder, a double acting piston, a piston rod in radially floating connection with said piston, a ball shaped member having a bore in which the rod is slidably mounted with a relatively close fit, a socket for holding said ball shaped member in which said member is free to rotate, and an elastic packing for preventing leakage between said ball shaped member and said socket.

6. In a device of the class described, a sleeve-like piston, a piston rod projecting through the piston and having annular shoulders adjacent the ends of the sleeve, and flexible packing rings interposed between said shoulders and the end portions of the sleeve to seal the joints therebetween, the portion of the rod within the sleeve being spaced from the piston to permit of a slight radial movement of the rod relatively to the axis of the piston.

7. In a device of the class described, a cylinder, a piston therein, an operating rod within the cylinder extending on opposite sides of the piston, guiding elements for the rod adjacent the ends of the cylinder chamber free to move relative to the axis thereof in a direction to permit of a slight radial movement of the rod relative to said axis, and packing means associated with said elements for preventing leakage through the piston.

8. In apparatus of the class described, a cylinder, a piston sleeve operable therein, a piston rod projecting through said sleeve and adapted to have a slight movement radially within the sleeve, said rod having shoulders thereon adjacent the ends of the sleeve and sealing elements interposed between said shoulders and parts of said sleeve to prevent leakage through the piston.

9. In apparatus of the class described, a cylinder, a sleeve-like piston operable therein, a piston rod projecting through the sleeve with sufficient space therebetween to permit of a slight radial movement of the rod within the piston, elastic packing rings substantially U-shaped in cross section interposed between the rod and the ends of the sleeve and means on the rod for holding the packing rings in engagement with the sleeve.

10. In apparatus of the class described, a cylinder, a piston sleeve operable within the cylinder, a piston rod projecting through the sleeve and having annular shoulders between which the ends of the sleeve are positioned, and separate packing rings interposed between said sleeve ends and said shoulders serving to form substantially leak proof joints between said shoulders and sleeve ends, and guiding means for the rod located at one end of the cylinder and designed to permit of a slight radial movement of the rod during reciprocation thereof.

11. In apparatus of the class described, a cylinder, a piston sleeve operable within the cylinder, a piston rod projecting through the sleeve, the portion of the rod lying within the sleeve having a smaller diameter than the inside diameter of the sleeve, shoulders formed on said rod between which the extremities of the sleeve terminate, and annular rings fitted between the ends of the sleeve and the shoulders to form substantially leak proof joints between said sleeve ends and said shoulders, said rings permitting radial movement of the rod within the cylinder while effectively sealing the ends of the sleeve.

12. In a device of the class described, a cylinder, a piston therein having an opening therethrough, an operating rod for the piston extending through the opening, sealing means interposed between the piston and rod permitting the latter to have a slight radial movement within the cylinder, a ball shaped guide adjacent one end of the cylinder through which the rod projects, a socket in which said ball shaped guide is free to move radially, and sealing means surrounding the rod adjacent the ball and socket for preventing leakage from the cylinder.

13. In a device of the class described, a cylinder, a piston therein, an operating rod within the cylinder extending on opposite sides of the piston, guiding elements for the rod adjacent the ends of the cylinder chamber free to move relative thereto in a direction to permit of a slight radial movement of the rod within the cylinder, packing interposed between each of said elements and the walls of the cylinder, a holding member for each of said elements, said holding members surrounding the rod, and packing interposed between each of said members and said rod to form fluid tight joints between the same.

14. In a device of the class described, a cylinder, a piston within the cylinder having a longitudinally extending bore, an operating rod for the piston movable axially of the cylinder and having a portion within said bore, a ring shaped member interposed between the rod and piston and permitting of a slight radial movement of the rod within the piston and means for guiding the rod axially of the cylinder and permitting it to have a slight radial movement therein.

15. In combination, a cylinder, a double acting piston therein, oppositely extending rod portions connected with the piston and arranged to move radially with respect to the axis thereof, stuffing boxes adjacent the ends of the cylinder in which said rod portions are arranged to slide, a reciprocally mounted crosshead connected with one of said rod portions and guide means for said rod portions arranged to permit of a slight axial movement of the rod during reciprocation of the crosshead.

16. In a device of the class described, a sleeve-like piston arranged for operation within a cylinder, said piston having spaced bearing portions thereon, an operating member for the piston extending therethrough and arranged for a slight radial movement relative to the axis thereof, said member having spaced annular shoulders thereon and flexible rings interposed between said shoulders and said bearing portions, said rings being movable relative to the piston to permit of a slight radial movement of said operating member during reciprocation of the piston.

In testimony whereof I hereunto affix my signature.

LORENZ KONRAD BRAREN.